Jan. 26, 1932.  N. M. MacINTOSH  1,842,991
ANTIGLARE SHIELD FOR AUTOMOBILES
Filed May 9, 1930
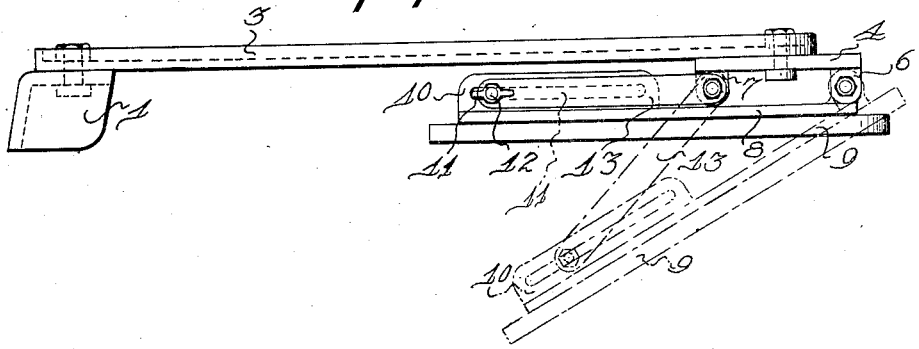
Fig.1.
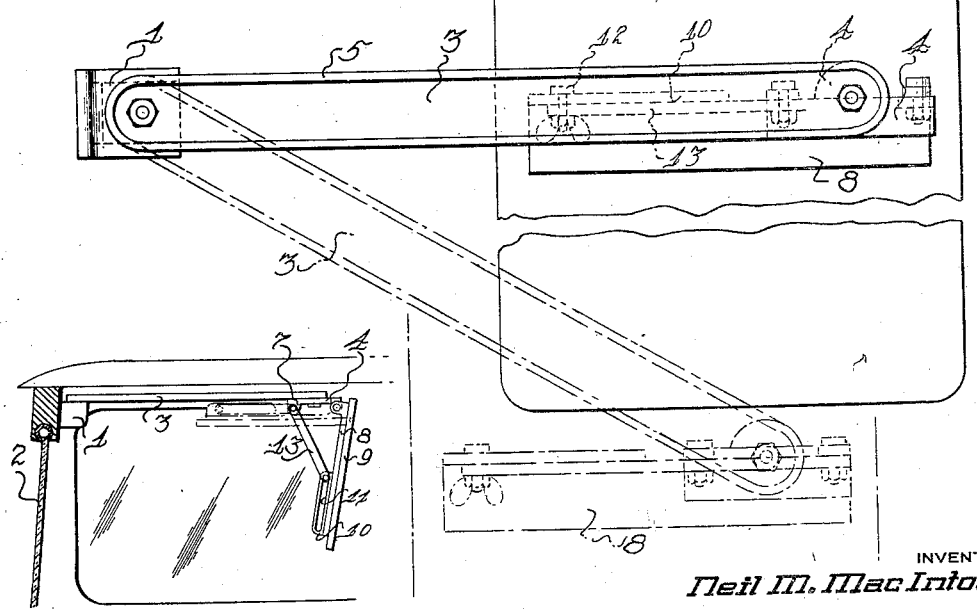
Fig.2.
Fig.3.
INVENTOR
Neil M. MacIntosh
BY
ATTORNEYS Patented Jan. 26, 1932

1,842,991

UNITED STATES PATENT OFFICE

NEIL M. MacINTOSH, OF DETROIT, MICHIGAN, ASSIGNOR OF ONE-HALF TO FERDINAND PLATAU, OF DETROIT, MICHIGAN

ANTIGLARE SHIELD FOR AUTOMOBILES

Application filed May 9, 1930. Serial No. 451,105.

The present invention pertains to a novel antiglare shield for automobiles and like vehicles.

The primary object of the present invention is to devise an attachment which may be conveniently mounted inside automobiles to protect the operator or passengers therein from the glare of the sun or of headlights on approaching or passing automobiles. The attachment is provided with an opaque plate that is supported in a manner facilitating varying movements, permitting it to be located at strategic points whereby it protects the eyes of the operator or the passengers of the automobile from glaring lights and eliminates the necessity and expense of providing awnings over the side windows and a visor over the windshield, the latter being common on the present day design of automobiles.

With the above and other ends in view the invention consists in the matters hereinafter set forth and more particularly pointed out in the appended claims, reference being had to the accompanying drawings, in which Figure 1 is a side elevation of the present attachment;

Fig. 2 is a top plan view, and

Fig. 3 is a fragmentary view of the interior of an automobile illustrating the attachment located adjacent the windshield.

Like characters of reference are employed throughout to designate the corresponding parts.

The numeral 1 indicates a bracket which is attached above the windshield 2 of an automobile or it may be attached above the side windows if such is desired. Pivotally secured to the bracket 1 is an arm 3 having a plate 4 pivotally mounted upon the outer end, the arm being formed in the nature of a channel member having reinforcing ribs 5 struck up around the edges thereof.

The plate 4 is provided with a pair of projecting ears 6 and 7, the ear 6 being provided to pivotally suport a bracket 8 upon which bracket is secured an opaque board or plate 9. The bracket 8 is provided with an outwardly projecting fin 10 having an elongated slot 11 formed therein to receive a set screw 12 which is mounted in the end of the link 13, the opposite end of the link being pivotally mounted on the ear 7.

As illustrated in Fig. 1 the plate 9 may be pivoted upon the ear 6 to a position substantially at right angles to the arm 3, one of the stages of this movement being illustrated in dotted lines. The link 13 permits this pivotal movement and the set screw 12 slides along the slot 11 and by tightening the set screw a slight amount the frictional engagement will maintain the plate in any position to which it has been moved. If it is desirable to hold the board or plate in an adjusted position permanently it may be accomplished by additional tightening pressure upon the set screw.

Although a specific embodiment of the present invention has been illustrated and described it is to be understood that various alterations may be made in the details of construction without departing from the spirit of the invention, and such changes are contemplated.

What I claim is:—

1. A device of the character described comprising a plate pivotally supported within an automobile, a pair of ears formed on said plate, an opaque board pivotally mounted on one of said ears, a link member having one end pivotally mounted on the other of said ears and its opposite end slidably connected to said board, and means carried by said link for frictionally resisting pivotal movement of said board.

2. A device of the character described comprising a plate pivotally supported within an automobile, a pair of ears formed on said plate, an opaque board pivotally mounted on one of said ears, and a link member having one end pivotally mounted on the other of said ears and its opposite end slidably connected to said board, said sliding connection comprising a slot and pin connection which is adapted to limit the amount of pivotal movement of said board and to frictionally resist movement within said limit.

3. A device of the character described comprising a plate pivotally supported within an automobile, a pair of ears formed on said plate, a bracket pivotally mounted on one of said ears, a link pivotally mounted at one end upon the other of said ears, a slot in said bracket adapted to receive a set screw mounted in the opposite end of said link, and an opaque board mounted upon said bracket.

4. A device of the character described comprising an opaque board, a bracket secured to said board, an elongated arm pivotally mounted on the side wall of an automobile to pivotally support said bracket remote from said wall, a link connected between said bracket and said arm, and means on said link for limiting the pivotal movement of said board and adapted to resist pivotal movement within said limit.

5. A device of the character described comprising an elongated arm pivotally mounted upon the inside wall of an automobile, a plate pivotally mounted upon said arm and remote from said wall, a pair of ears formed in said plate, an opaque board pivotally mounted on one of said ears, and a link member having one end pivotally mounted on the other of said ears and its opposite end slidably connected to said board in a manner to hold said plate in any position of its pivotal movement.

6. A device of the character described comprising an elongated arm pivotally mounted upon the inside wall of an automobile, a plate pivotally mounted upon said arm and remote from said wall, a pair of ears formed on said plate, a bracket pivotally mounted on one of said ears, a link pivotally mounted at one end upon the other of said ears, a slot in said bracket, a set screw mounted in the opposite end of said link and received in said slot, and an opaque board mounted upon said bracket.

In testimony whereof I affix my signature.

NEIL M. MacINTOSH.